US005695803A

United States Patent [19]
Sharp et al.

[11] Patent Number: 5,695,803
[45] Date of Patent: Dec. 9, 1997

[54] NUTRITIONAL PRODUCTS CONTAINING MODIFIED STARCHES

[75] Inventors: Rickey L. Sharp, Woodland Park, Colo.; John F. Robyt; Murray L. Kaplan, both of Ames, Iowa

[73] Assignee: Iowa State University Research Foundation, Inc., Ames, Iowa

[21] Appl. No.: 465,884

[22] Filed: Jun. 6, 1995

[51] Int. Cl.⁶ .......................... A23L 1/0522; A21D 2/02; A21D 2/10; C08B 30/12
[52] U.S. Cl. .................. 426/549; 426/661; 426/578; 127/32; 127/33; 127/38; 127/71
[58] Field of Search ..................... 426/549, 661, 426/578; 127/32, 71, 33, 38

[56] References Cited

U.S. PATENT DOCUMENTS 5,156,875 10/1992 Mouse .
5,364,652 11/1994 Ohkuma et al. ..................... 426/549

OTHER PUBLICATIONS

Okuma et al JP, Abstracts vol. 16, No. 33 Jan. 28, 1992.
Takaj et al JP Abstracts vol. 5, No. 102 Jul. 2, 1981.
Behall et al., "Effect of starch structure on glucose and insulin responses in adults," *Am. J. Clin. Nutr.*, 47, 428–32 (1988).
Bei et al., "Glucose polymer increases jejunal calcium, magnesium, and zinc absorption in humans," *Am. J. Clin. Nutr.*, 44, 244–247 (1986).
Crapo, "Simple Versus Complex Carbohydrate Use In The Diabetic Diet," *Ann. Rev. Nutr.*, 5, 95–114 (1985).
Davis et al., "Carbohydrate–electrolyte drinks: effects on endurance cycling in the heat," *Am. J. Clin. Nutr.*, 48, 1023–1030 (1988).

Dubois et al., "Colorimetric Method for Determination of Sugars and Related Substances," *Anal. Chem.*, 28, 350–356 (1956).
Fox and Robyt, "Modification of starch granules by hydrolysis with hydrochloric acid in various alcohols, and the formation of new kinds of limit dextrins," *Carbohydrate Res.*, 227, 163–170 (1992).
Geske and Sharp, "Pre-exercise Ingestion of Glucose and Fructose: Effects on Exercise Performance When Exercise is Begun at Predetermined Time of Peak Blood Concentrations of the Sugar," *Medicine and Science in Sports and Exercise*, 16, 190 (1984).
Holl and Allen, "Comparative effects of meals high in protein, sucrose or starch on human mineral metabolism and insulin secretion," *Am. J. Clin. Nutr.*, 48, 1219–1225 (1988).
Knowles et al., "Response of fractional calcium absorption in women to various coadministered oral glucose doses," *Am. J. Clin. Nutr.*, 48, 1471–1474 (1988).
Ma and Robyt, "Preparation and characterization of soluble starches having different molecular sizes and composition, by acid hydrolysis in different alcohols," *Carbohydrate Res.*, 16, 283–297 (1987).
Ross et al., "Glycemic index of processed wheat products," *Am. J. Clin. Nutr.*, 46, 631–635 (1987).

*Primary Examiner*—Donald E. Czaja
*Assistant Examiner*—Choon P. Koh
*Attorney, Agent, or Firm*—Leydig, Voit & Mayer, Ltd.

[57] ABSTRACT

Modified starch materials having a number average molecular weight of at least 10,000 for nutritional products provide a relatively slow release of metabolizable carbohydrates, giving a source of carbohydrate energy over a longer period of time than can be obtained from glucose and other carbohydrates such as lactose, fructose, or sucrose.

19 Claims, 5 Drawing Sheets

NUTRITIONAL PRODUCTS CONTAINING MODIFIED STARCHES

This invention was funded by the United States Department of Agriculture under Grant No. 91-34115-5903.

FIELD OF THE INVENTION

This invention relates to nutritional products containing modified starches and, more particularly, to water-soluble modified starches and to nutritional products including such starches characterized by highly desirable properties.

BACKGROUND OF THE INVENTION

Carbohydrates are used as the major energy source in a variety of nutritional products ranging from, for example, liquid nutritional supplements for adults with compromised digestive functions, infant formulas, and carbohydrate supplements for exercise and athletic activity. Carbohydrate supplements are likewise included in a variety of solid nutritional products.

The carbohydrates previously used as such supplements generally comprise glucose (dextrose), fructose, lactose, sucrose, and glucose polymers. Such carbohydrates typically are of relatively low molecular weight.

The use of these previously used carbohydrate sources generally exert a degree of osmolarity that, in many situations, is undesirable. Thus, the use of such carbohydrate supplements or sources can result in consequent gastrointestinal effects such as diarrhea and distention. In addition, the use of such carbohydrate sources can limit the availability of water for hydration purposes. Additionally, the high insulin responses to glucose polymers can lead acutely to elevated postprandial insulin secretion and lipogenesis, hypoglycemia, and chronically to elevated blood lipids and increased risk for cardiovascular disease.

Accordingly, to serve as the major energy source for enteral dietary formulations, other liquid nutritional supplements and other foods in general, the carbohydrate source must satisfy several criteria. From the physiological viewpoint, a suitable carbohydrate source should desirably have satisfactory glycemic, endocrine, and metabolic responses under varying physiological conditions. Additionally, no significant adverse effects on body composition and lipogenesis should result from including the carbohydrate supplement. Still further, such carbohydrate sources must be capable of being adequately digested and, preferably, have appropriate oxidation characteristics.

From the physical standpoint, the carbohydrate source should have sufficient water-solubility, particularly when used in liquid supplements so that useful amounts of the carbohydrate source can be utilized in the formulation. It is also desirable for the carbohydrate source to be capable of being readily gelatinized.

Prior literature reflects substantial work relating to the effects of starches as nutritional supplements. It has thus been suggested that the structure of food starches affects the rate of digestion of the starch as well as the glycemic and insulin responses after digestion. Behall et al., "Effect of Starch Structure on Glucose and Insulin Responses in Adults," Am. J. Clin. Nutr., 47, 428 (1988); Ross et al., "Glycemic Index of Processed Wheat Products," Am. J. Clin. Nutr., 46, 631 (1987).

A slow rate of starch digestion, giving low glycemic and insulin responses are likewise considered desirable for the general population, during sustained physical activity. Davis et al., "Carbohydrate-Electrolyte Drinks: Effects on Endurance Cycling in the Heat," Am. J. Clin. Nutr., 48, 1023 (1988); Geske et al., "Preexercise Ingestion of Glucose and Fructose: Effects on Exercise Performance When Exercise is Begun at Predetermined Time of Peak Blood Concentration of the Sugar," Med. Sci. Sports, 16 190 (1984). Such a slow rate is also desirable for use in the diets for diabetic individuals. Crapo, "Simple Versus Complex Carbohydrate Use in the Diabetic Diet," Am. Rev. Nutr., 5, 95 (1985). Such a diet would lower the dependence of diabetics on deleterious high fat diets by enabling more starchy foods with lower glycemic indices to be introduced into the diet.

It has been proposed that starches with high amylose content yield more sustained plasma glucose levels with lower requirements for insulin. Behall, et al. "Effect of Starch Structure on Glucose and Insulin Response in Adults," Am. J. Clin. Nutr., 47, 428 (1988). Likewise, it has been stated by Behall et al. that subsequent blood lipid and circulating insulin levels also may change after ingestion of high amylose starches.

Data has also shown that glucose and glucose polymers, fed simultaneously with calcium, can increase calcium absorption in healthy subjects and in hospitalized patients. Bei et al., "Glucose Polymer Increase Jejunal Calcium, Magnesium and Zinc Absorption in Humans," Am. J. Clin. Nutr., 44, 244 (1986); Knowles et al. "Response of Fractional Calcium Absorption in Women to Various Administered and Glucose Doses," Am. J. Clin. Nutr., 48, 1471 (1988). However, it has also been noted that diets high in simple sugar can increase calcium excretion in urine by the same mechanism as dietary protein and amino acids, i.e., inhibition of reabsorption of calcium in the kidney tubules. Inhibition of calcium reabsorption by insulin is at least partially involved. Holl et al., "Comparative Effects of Meals High in Protein, Sucrose, or Starch on Human Mineral Metabolism and Insulin Secretion," Am. J. Clin. Nutr., 48, 1219 (1988). Accordingly, it would be undesirable to employ carbohydrates that are rapidly metabolizable, ostensibly as an aid to calcium absorption, if such carbohydrates simultaneously increased calcium excretion.

However, the use of starches characterized by a low glycemic index might serve to increase calcium absorption, particularly in the jejunum, ileum and large intestine, unaccompanied by the insulinogenic effects of glucose or the like, which block calcium reabsorption. Starches of this type might be preferred over glucose polymers in dietary products for physiological conditions where assurance of sufficient energy intake is needed and where maintenance of body calcium is most important. Conditions such as osteoporosis, diabetes, prolonged physical work, or even prolonged missions in gravity-free space are illustrative examples.

Further, the use of carbohydrates as a major energy source in a nutritional supplement pose a major problem. Typically, these carbohydrates exert a degree of osmolarity that is undesirable in many situations because of the subsequent gastrointestinal effects such as diarrhea or distention. Presently used glucose polymers, consisting of mixtures of relatively small molecular weight molecules, disaccharides and monosaccharides, do decrease the osmotic pressure somewhat in comparison to other carbohydrate sources. However, the decrease in osmotic pressure which results is generally not as much as is desired, nor is the decrease obtained very reproducible.

One major obstacle to the use of starches for many applications is their typically characteristic water insolubility. Relatively water insoluble materials would be unsuitable for many nutritional supplements such as, for example, enteral dietary formulations and liquid nutritional supplements.

Chemical modification of starches by various techniques is also well known. For example, acid treating of starch was explored late in the 19th century. Some properties of these acid-treated starches, as compared to those of the untreated starches, include decreased intrinsic viscosity and decreased gel strength.

Also, Ma and Robyt, "Preparation and Characterization of Soluble Starches Having Different Molecular Size and Composition, by Acid Hydrolysis in Different Alcohols," *Carbohydrate Res.*, 166, 283 (1987), reported modifying potato and waxy maize starches with hydrochloric acid in methanol, ethanol, 2-propanol and 1-butanol at 65° C. for one hour. The modified starches were readily soluble in hot water, giving crystal-clear solutions up to a concentration of at least 20% (w/v).

More recently, Fox and Robyt, "Modification of Starch Granules by Hydrolysis with Hydrochloric Acid in Various Alcohols, and the Formation of New Kinds of Limit Dextrins," *Carbohydrate Res.*, 2.27, 163 (1992), published further results concerning treating potato starch at ambient temperature (20°–21° C.). It was observed that new types of limit dextrins can be produced by an appropriate choice of alcohol and concentration of acid.

Thus, despite prior efforts, there still exists the need for a carbohydrate source for nutritional supplements that is capable of satisfying the demanding physiological-related criteria described herein for such an application, as well as possessing the appropriate physical characteristics needed for commercial utility.

It is accordingly a principal object of the present invention to provide a starch material having the physiological responses satisfactory for use in nutritional food formulations.

A further and more specific object of this invention provides modified starches having desired glycemic, endocrine, and metabolic responses in humans under a variety of physiological conditions.

Yet another object lies in the provision of modified starches having physical characteristics satisfactory to allow use in commercial nutritional food applications.

Another object provides nutritional products containing such starches.

Yet another object is to provide a method for making such starches. A related and more specific object provides modified starches having acceptable water solubility characteristics.

Other objects and advantages will become apparent as the following description proceeds.

SUMMARY OF THE INVENTION

In accordance with the present invention, it has been found that starches which are appropriately acid-treated yield modified starches that possess extremely desirable physiological characteristics when employed as an energy source for nutritional products. More particularly, such modified starches cause only a relatively slight degree of osmolarity and a low insulin response while achieving desirable blood glucose responses. A particularly preferred energy source, due to its oxidation and digestibility characteristics, can be achieved by utilizing modified corn starch, more preferably modified amylomaize-7 corn starch.

DETAILED DESCRIPTION OF THE INVENTION

Modified starches suitable for use in the present invention should have a number average molecular weight of at least about 10,000. Preferably, the molecular weight will be in the range of about 20,000 to 40,000, even more preferably about 30,000 or so. Modified starches having molecular weights in excess of about 90,000 or more will not typically provide the characteristics desired for a nutritional product. For the purposes herein, number average molecular weight may be determined by preparing a solution containing 10.0 mg/ml of starch, and determining reducing values by the Somogyi-Nelson, alkaline-copper procedure or the copper bicinchoninate microprocedure, using maltose as the standard. The number average molecular weight can be obtained by the following:

$$\overline{MW_n} = \frac{\text{total carbohydrate } (\mu g)}{\text{reducing value } (\mu g \text{ of maltose})} \times 324$$

where the total carbohydrate is obtained by a phenolsulfuric acid analysis, Dubois et al., "Colorimetric Method for Determination of Sugars and Related Substances," *Anal. Chem.*, 28, 350–353 (1956); Fox and Robyt, "Miniaturization of three carbohydrate analyses using a microsample plate reader," *Anal. Biochem.*, 195, 93–96 (1991), and where the reducing value is determined using the Somogyi-Nelson alkaline-copper procedure, Robyt and Whelan, "Starch and Its Derivatives," pp. 431–432, 4th ed. (Chapman and Hall, London, 1968), or by the copper-bicinchoninate microprocedure, Fox and Robyt, *Anal. Biochem.*, 195, 93–96 (1991). Alternatively, the number average molecular weight may be determined from the average degree of polymerization (d.p.) using the following relationships:

$$\overline{d.p.} = \frac{\text{total carbohydrate } (\mu g)}{\text{reducing value } (\mu g \text{ of maltose})} \times 2$$

$$\overline{MW_n} = (\overline{d.p.}) \times 162$$

Both methods provide the same number average molecular weight values, as has been determined from experience relating to the modified starches described herein.

In addition, when used as a liquid nutritional supplement, suitable modified starches should have sufficient solubility in water so that the volume of liquid that one would have to consume to achieve the desired metabolic benefit would not be unduly excessive. While some applications might find as little as 5 mg/ml or even 2 mg/ml suitable, it will generally be desirable to have a water solubility of at least 10 mg/ml, which will be satisfactory for many applications.

In general, when the modified starches of this invention are used as a liquid nutritional supplement, the higher the water solubility is the better. Ideally, the water solubility of these modified starches would be 30 mg/ml or more. The relative water solubility of the resulting modified starch will be determined by the treating process used, as will be discussed hereinafter.

An appropriate method for determining the level of water solubility is the phenol/sulfuric acid method. Dubois et al., *Anal. Chem.*, 28, 350–353 (1956). In general, this method comprises suspending 500 mg of the modified starch in 2 ml of water, autoclaving the resulting suspension at 121° C. for 30 minutes, and then allowing the autoclaved suspension to cool to room temperature. The remaining undissolved starch is then removed by centrifugation, and a total carbohydrate analysis, using the phenol/sulfuric acid method, is carried out on the supernatant.

Suitable modified starches can be obtained by treating the starch of choice with hydrochloric acid in lower alcohol and coordinating the treating parameters so as to yield the desired molecular weight. Achieving modified starches with molecular weights useful for the present invention should likewise result in a satisfactory degree of water solubility. However, the water solubility can be determined as previously described so as to insure that the solubility is in fact appropriate.

In general, the parameters which should be coordinated involve the type and relative amount of the starch to be treated, the selection of the lower alcohol, the treating temperature, the time, and the amount of the hydrochloric acid used. As to the type of starch, any starch source may be used which, upon treating, provides a modified starch of suitable molecular weight that also imparts the desired metabolic benefits desired for the particular application, as will be discussed hereinafter. Illustrative examples of starch sources include corn, potato, oat, rice, and wheat. Preferably, corn starch is used, and, even more preferably, amylomaize-7. It is, thus, preferred to use starch sources that possess a relatively high amylose content.

Regarding the relative amount of the starch in relation to the volume of the lower alcohol employed, the amount used can be varied as is desired for the treating process efficiency. By way of example, it will be suitable to use starting starch levels of from about 0.25 to 1.0 kg/liter of the lower alcohol.

Suitable lower alcohols to serve as the treating medium include, for example, methanol, ethanol, propanol (e.g., 2-propanol), and butanol (e.g., 1-butanol). As may be appreciated, it may be more desirable to utilize ethanol for making the modified starches for the nutritional products of this invention. However, any of the other lower alcohols can be used; but, when used, a wash should be carried out to remove the acid and alcohol. As one example, a 50% v/v water-ethanol wash can be used.

The treating temperature may be varied from ambient (i.e., 21°–22° C.) to about 60° C. or so. For ease of preparation and to avoid the expense of heating, ambient conditions are desirable. The treating time can be varied as desired to allow the treatment to reach completion. A treating time of three days has been found to be satisfactory.

The level of hydrochloric acid employed can be varied from about 10 up to 100 ml/liter of the lower alcohol. Typically, the molecular weight of the modified starch will be reduced with increasing amounts of hydrochloric acid.

The coordination of the treating parameters will be further discussed in the Examples. As will be seen, modified starches having the desired molecular weight and solubility characteristics can be readily provided.

Use of the thus-modified starches of the present invention as nutritional supplements will exert only a slight degree of osmolarity. More particularly, an osmolarity (measured using freeze-point osmolarity) of no more than about 500 mOsm/l can be provided. Preferably, the modified starches utilized should have an osmolarity of no more than about 200 mOsm/l, even more preferably, no more than 100 mOsm/l.

Thus, in comparison to the carbohydrates previously used as nutritional supplements, the modified starches of this invention impart highly desirable osmolarity characteristics. Indeed, the slight osmolarity that is exerted should allow the modified starches to significantly minimize, and perhaps even eliminate, undesirable gastrointestinal effects such as diarrhea and distention.

Another aspect of this invention is the superior insulin response characteristics that are achieved by using the modified starches of this invention in comparison to the insulin responses that occur with previously used carbohydrates. In general, consistent with having satisfactory digestibility to provide the desired caloric or energy value, the lower the insulin response that results, the better.

In accordance with this invention, in comparison to glucose, the modified starches result in insulin responses no more than about 50% of the insulin responses resulting from using glucose. Preferably, the modified starches of the present invention result in insulin responses of no more than about 10%, or even less. The insulin response comprises the rise in blood insulin concentration from the pre-feeding concentration to the peak concentration (usually occurring within one hour after feeding), and the rise associated with the feeding of the modified starch is expressed as a percentage of the rise observed when an equivalent mass of glucose is fed to the same person under the same conditions.

The modified starches useful in this invention likewise exhibit highly desirable blood glucose response characteristics in comparison to those resulting from using glucose. More specifically, the blood glucose response (peak) resulting when the modified starches of this invention are utilized is no more than 50%, preferably no more than 12% and, even more preferably, no more than 0%, while the blood glucose response (area) is no more than 75%, preferably no more than 30%, and, even more preferably, no more than 10% of the blood glucose response resulting when dextrose or glucose is used. The blood glucose response (peak) is defined as the rise in blood glucose concentration from the pre-feeding concentration to the peak concentration (usually occurring within one hour after feeding), expressed as a percentage of the rise observed when an equivalent mass of glucose is fed. The blood glucose response (area) consists of the total area under the curve of blood glucose concentration (millimolar) over a three-hour period after ingestion of 75 gms suspended in 350 ml water, the subjects being tested following a 12 hour fast. The total area of the modified starch feeding is expressed as a percentage of the total area obtained after feeding an equivalent mass of glucose. The foregoing assumes that the blood glucose concentration does not fall below the pre-ingestion level at any time during the three-hour test. More particularly, in a small percentage of the population (perhaps 10 to 20%), the high insulin produced with glucose will cause the glucose level to not only fall to the pre-ingestion level, but to below that level. Consequently, such a precipitous drop can decrease the area under the blood glucose curve, thereby making any comparison inaccurate.

Suitable protocols for determining the physiological characteristics described herein are set forth below:

Glycemic response protocol

Ten healthy college-aged (25±1 yr.) subjects participate (6 males, 4 females). The subjects are individually screened for participation and eliminated from the study if diabetes or a history of elevated fasting blood glucose concentration is found. In addition, subjects are eliminated from the study if they were taking any medications known to affect blood glucose hemeostatis and/or insulin responses to meals.

The subjects are required to record all food and beverages consumed for two days prior to their first trial and then to duplicate this diet for two days prior to each subsequent trial. Before participating in the first trial, the subject's diet is analyzed using Nutritionist III™ for total calories, grams of carbohydrate, grams of fat, and grams of protein. The results of the two-day diet analysis are averaged on a per day basis. If a subject's diet analysis revealed that his or her dietary intake of carbohydrates was less than 150 g/day, his/her trial is postponed and the subject is instructed to eat more carbohydrates for several (2–3 days) days before the rescheduled trial.

In addition, the subjects are required to fast overnight (no food, calorie-containing beverages, or caffeine) and to abstain from any exercise or alcohol for 24 hours prior to each experimental trial. Finally, water intake is prohibited during the one hour before each experimental trial in order to assist with the standardization of fluid volume in the stomach.

When the subject reports to the laboratory for each experimental trial, a flexible Teflon catheter is inserted into a prominent forearm vein. To prevent blood from clotting in the catheter, 2 ml of sterile saline (0.9% sodium chloride for injection) is infused into the catheter which is capped with a sterile 3-way stopcock. Blood samples are obtained from the catheter immediately before ingestion of the experimental solution, 30 minutes after ingestion is complete, 60 minutes after ingestion, 90 minutes after ingestion, 120 minutes after ingestion, and 180 minutes after ingestion. Prior to each blood sample, 4 ml of blood is withdrawn from the catheter and discarded to remove the saline left in the stopcock and catheter. The blood samples are taken with heparinized syringes and transferred into labelled test tubes. The samples are then immediately centrifuged at 2000×g for minutes to separate the plasma from the red blood cells. The plasma is then removed, transferred to a separate tube and frozen at −20° C. where the sample is stored for later analysis of glucose and insulin concentration.

The experimental solutions containing the carbohydrate being tested are administered in a randomized, double-blind manner. Each solution is prepared using 75 grams of the carbohydrate mixed in 300 ml water at room temperature. The solution is sipped through an opaque straw from a covered opaque container. The solution is swirled immediately before drinking to ensure thorough mixing of contents and then sipped continuously over a two-minute period. Once the container is emptied, 60 ml of water is added to the container and swirled to mix with any remaining solids and ingested by the subject. All experimental trials are begun between 7:00 and 9:00 AM. Start time is assessed as the time when the subject began ingesting the experimental solution. During the first trial, this time is noted and duplicated for that subject on each subsequent trial.

Once all experimental trials for all subjects are complete, plasma samples are analyzed. Plasma glucose concentration is measured in duplicate on each sample using a YSI 2300 Stat Glucose/Lactate Analyzer (Yellow Springs Instruments, Yellow Springs, Ohio). These duplicate measurements are averaged for further analysis. Plasma insulin concentration is measured using double-antibody $^{125}$iodine radioimmunoassay kits for insulin supplied by ICN Biomedicals, Inc. (Costa Mesa, Calif.). Radioactivity is counted on a Packard Cobra II Auto-Gamma Counter. Each plasma insulin determination is made in triplicate, and the average of the three determinations is used in subsequent analyses.

For each experimental trial on each subject, the area under the plasma glucose curve is measured. The geometric area above resting, pre-ingestion, plasma glucose concentration, is measured by entering the glucose concentrations that are obtained at the designated times after ingestion into a computer program that calculates area under curves using a trapezoidal model (SigmaStat 4.1, Jandel Scientific, San Rafael, Calif.). Because this procedure defines only the area above pre-ingestion plasma glucose concentration, it will be referred to as hyperglycemic area. To calculate the glycemic index, the hyperglycemic area occurring after ingestion of the experimental solution is expressed as a percentage of the hyperglycemic area occurring after ingestion of the glucose solution.

To characterize the plasma insulin responses of each subject to each of the experimental solutions, the amount of increase in plasma insulin concentration from pre-ingestion to peak insulin concentration irrespective of time is calculated for each subject under each treatment. This calculated increase is expressed as a percentage of the calculated increase that occurred when the glucose solution is ingested.

The plasma glucose concentrations that are obtained after ingestion of the experimental solutions are compared for significant differences between treatments and within treatments using a two-way analysis of variance for repeated measures. If a significant F-ratio is obtained in the analysis of variance, a Newman-Kuel multiple range test is used to determine between which treatments and/or between which times within treatments significant differences occurred. The insulin concentrations are analyzed in the same way.

Once the calculated data are obtained (hyperglycemic areas, glycemic index, and insulin responses) for each subject under each treatment, the data is examined for significant differences between treatments using conventional statistical methods. Hyperglycemic area is compared between glucose and the carbohydrate, or carbohydrates, being tested using a one-way analysis of variance for repeated measures. If a significant F-ratio was obtained in the analysis of variance, a Newman-Kuel multiple range test is used to determine between which treatments significant differences occurred. Glycemic index is tested for significant differences between the test carbohydrates using a paired t-test. Insulin responses are compared for significant differences between the test carbohydrates using a one-way analysis of variance for repeated measures. If a significant F-ratio is obtained in the analysis of variance, a Newman-Kuel multiple range test is used to determine between which treatments significant differences occurred. For all statistical tests, the level of significance that is used to determine if a significant difference occurred is $p<0.05$.

Metabolic Protocol—Oxidation During Exercise

Ten healthy (28±2 yr) male subjects participate. The subjects are individually screened for participation and eliminated from the study if diabetes or a history of elevated fasting blood glucose concentration is found. In addition, subjects are eliminated from the study if they are taking any medications that are known to affect blood glucose homeostasis and/or insulin responses to meals.

The subjects are required to record all food and beverages consumed for three days prior to their first trial and then to duplicate this diet for three days prior to each subsequent trial. Before participating in the first trial, the subject's diet is analyzed using Nutritionist III™ for total calories, grams of carbohydrate, grams of fat, and grams of protein. The results of the three-day diet analysis are averaged on a per day basis. If a subject's diet analysis revealed that his dietary intake of carbohydrates was less than 150 g/day, his trial is postponed and the subject is instructed to eat more carbohydrates for several days before the rescheduled trial.

In addition, subjects are required to fast overnight (no food, calorie-containing beverages, or caffeine) and to abstain from any exercise or alcohol for 24 hours prior to each experimental trial. Finally, water intake is prohibited during the one hour before each experimental trial in order to assist with the standardization of fluid volume in the stomach.

At least one week before starting the experimental trials, the subjects are tested for maximum oxygen uptake ($VO_2$max) on a cycle ergometer. $VO_2$max is determined using a graded exercise test starting with 4 minutes of pedaling at 60 rpm and no workload. Following this initial warm-up period, the subjects maintain the 60 rpm while the workload is increased by 25 watts every three minutes. The test is continued in this manner until the subject can no longer keep his pedal rate at the prescribed 60 rpm. Oxygen uptake is measured continuously during the exercise test using indirect calorimetry. Inspired air volumes are measured using a Parkinson-Cowan CD-4 dry gas meter, and expired air is collected in a three liter mixing chamber. Expired air samples are collected continuously from the mixing chamber and analyzed for oxygen and carbon dioxide concentrations (Applied Electrochemistry SA-2 Oxygen Analyzer and Beckman $LB_{-2}$ $CO_2$ Analyzer, respectively). These analyzers are calibrated immediately before each exercise test using known gas standards. The electrical output from the $O_2$ analyzer, $CO_2$ analyzer, and the gas meter are routed into an A-D converter connected to an Apple IIe computer. These signals are processed, and oxygen uptake is calculated for each 30 second period in exercise using commercial $VO_2$ software (REP-200B, Rayfield Equipment, Inc.). Maximum oxygen uptake is taken as the highest $VO_2$ achieved during the exercise test. Oxygen uptake at each workload is calculated as the average $VO_2$ during the last minute of each workload. The workload corresponding to 70% $VO_2$max for each subject is estimated using a linear regression between $VO_2$ and workload. This workload is then used during the subsequent experimental trials.

When the subject reported to the laboratory for each experimental trial, a flexible Teflon catheter is inserted into a prominent forearm vein. To prevent blood from clotting in the catheter, 2 ml of sterile saline (0.9% sodium chloride for injection) is infused into the catheter which is capped with a sterile 3-way stopcock. Blood samples are obtained from the catheter immediately before ingestion of the experimental solution (pre-ingestion), 30 minutes after ingestion was complete (pre-exercise), 30 minutes into exercise, and 60 minutes into exercise. Prior to each blood samples, 4 ml of blood is withdrawn from the catheter and discarded to remove the saline left in the stopcock and catheter. The blood samples are taken with heparinized syringes and transferred into labelled test tubes. The samples are then immediately centrifuged at 2000×g for 10 minutes to separate the plasma from the red blood cells. The plasma is then removed, transferred to a separate tube and frozen at −20° C. where the sample is stored for later analysis of glucose concentration, insulin concentration, and lactate concentration.

The experimental solutions containing the test carbohydrates are administered in a randomized, double-blind manner. Each solution is prepared using 75 grams of the carbohydrate mixed in 300 ml artificially sweetened lemon drink (Wyler's) at room temperature. The placebo consists of only the lemon flavored drink. The solution is sipped through an opaque straw from a covered opaque container. The solution is swirled immediately before drinking to ensure thorough mixing of contents and then sipped continuously over a two-minute period. Once the container is emptied, 60 ml of the lemon drink is added to the container and swirled to mix with any remaining solids and ingested by the subject. All experimental trials are begun between 7:00 and 9:00 AM. Start time is assessed as the time when the subject began ingesting the experimental solution. During the first trial, this time is noted and duplicated for that subject on each subsequent trial.

Muscle biopsy samples are obtained immediately before and after each experimental exercise bout from the vastus lateralis muscle using the needle biopsy procedure described by Bergstrom [Bergstrom, "Muscle electrolytes in man.," *Scandinavian Journal of Clinical Investigation*, 14, 1–110 (1962)]. After each biopsy is taken, the sample is dipped in liquid nitrogen to quick-freeze the sample and is stored in liquid nitrogen until later analysis of glycogen concentration. Once all of the experimental trials are completed, each biopsy sample is dissected at −20° C. into three separate 5–10 mg pieces, weighed while frozen on a microbalance, and stored. Glycogen concentration of each of the three pieces is performed using the enzymatic method described by Passonneau (Passonneau et al., "A comparison of three methods of glycogen measurement in tissues," *Anal. Biochem.*, 60, 405–412 (1974)). The glycogen concentration measurements obtained on the three pieces of the same muscle sample are average, and this average concentration is used in further analysis. Glycogen use during exercise is measured as the difference in glycogen concentration between the pre-exercise and post-exercise muscle samples.

Thirty minutes after the subject ingests the experimental solution and immediately after the pre-exercise biopsy is taken, a 3–5 minute unloaded warm-up period on the cycle ergometer is allowed. At the end of this warm-up period, the workload is immediately set at the predetermined workload corresponding to 70% of that subject's $VO_2$max. This exercise is continued for 60 minutes. During the exercise test, $VO_2$ is measured as described above during minutes 0–5, 25–30, and 55–60. The average $VO_2$ (L/min) and respiratory quotient (RQ=$VCO_2/VO_2$) obtained during the last two minutes of each of these periods are used in calculating carbohydrate oxidation rates. Blood samples are also obtained during these time periods. Within five minutes after the conclusion of the 60-minutes exercise, the post-exercise muscle biopsy is performed.

Once all experimental trials for all subjects are completed, plasma samples are analyzed. Plasma glucose and lactate concentrations are measured in duplicate on each sample using a YSI 2300 State Glucose/Lactate Analyzer. The duplicate measurements are averaged for further analysis.

Carbohydrate oxidation rates (g/min) are calculated for each trial of each subject using the $VO_2$ and RQ data obtained during the 60-minute exercise bout. To calculate the total carbohydrate oxidation, the $VO_2$ and RQ results (expressed on a per minute basis) are obtained at three time periods (0–5 min, 25–30 min, and 55–60 min). During each of these time periods, average $VO_2$ and average RQ are calculated. From these data, carbohydrate oxidation rate (grams per liter of oxygen consumed per minute) is estimated using the thermal equivalents for oxygen as described by Zuntz (Zuntz, *Pflugers Archives of Physiology*, 83, 557 (1901). The resultant average carbohydrate oxidation obtained in the 0-5 minute period is multiplied by 5 to yield total carbohydrate oxidized in the first 5 minutes of exercise (g/5 min). The averaged rate of carbohydrate oxidation obtained in the 25-30 minute period is multiplied by 25 to yield total carbohydrate oxidized from 6 minutes until 30 minutes (g/25 min). The averaged rate of carbohydrate oxidation obtained in the 55-60 minute period is multiplied by 30 to yield total carbohydrate oxidized in the second 30 minutes of the exercise (g/30 min). The three total carbohydrate estimates are then added to yield the carbohydrate oxidized during the entire 60-minute exercise bout (g/hr).

Total carbohydrate oxidation (g/hr) is then compared among the treatments by first calculating the difference in carbohydrate oxidation between the placebo trial and the glucose trial. This provides a measurement of the amount of increase or change in carbohydrate oxidation that is produced by a glucose feeding. The differences in carbohydrate oxidation between placebo trial versus test carbohydrate(s) are also computed. The change in carbohydrate oxidation for each test carbohydrate is then expressed as a percentage of the change in carbohydrate oxidation that is produced by the glucose feeding.

For each experimental trial on each subject, the area under the plasma glucose curve is measured. The geometric area above resting (pre-ingestion) plasma glucose concentration is measured by entering the glucose concentrations that are obtained at the designated times after ingestion into a computer program that calculates area under curves using a trapezoidal model (SigmaState 4.1). Because this procedure defines only the area above pre-ingestion plasma glucose concentration, it will be referred to as hyperglycemic area.

The plasma glucose and lactate concentrations that are obtained after ingestion of the experimental solutions are compared for significant differences between treatments and within treatments using a two-way analysis of variance for repeated measures. If a significant F-ratio is obtained in the analysis of variance, a Newman-Kuel multiple range test is used to determine between which treatments and/or between which times within treatments significant differences occurred.

Hyperglycemic areas, muscle glycogen use, and total carbohydrate oxidation (g/hr) for each subject under each treatment are examined for significant differences between treatments using conventional statistical methods. Hyperglycemic area, muscle glycogen use, and total carbohydrate oxidation (g/hr) are compared between glucose, the test carbohydrate(s), and placebo using a one-way analysis of variance for repeated measures. If a significant F-ratio is obtained in the analysis of variance, a Newman-Kuel multiple range test is used to determine between which treatments significant differences occurred. For all statistical tests, the level of significance that was used to determine if a significant difference occurred is $p<0.05$.

As has been previously alluded to herein, useful modified starches should have adequate digestibility so that caloric or energy values are provided when used. In accordance with this invention, the modified starches that are useful exhibit a digestibility of at least about 50%, preferably 90%, and, even more preferably, 100%. This characteristic is determined as the percentage of the modified starch material fed that is not excreted as carbohydrate in feces for a three-day period. A suitable protocol to determine digestibility is set forth in Example 7 hereinafter. It has been found that modified corn starch, particularly amylomaize-7, tends to exhibit more desirable digestibility characteristics as compared to modified potato starches.

In accordance with the preferred embodiment of this invention, the modified starches utilized preferably have desirable metabolic characteristics. One method of measuring one important metabolic fate is via determining the oxidation characteristics. More particularly, the preferred modified starches of the present invention possess oxidation characteristics of at least 50%, preferably at least 100%, and, even more preferably, at least about 200%, the percentages being measured as hereinafter set forth. Such carbohydrate oxidation, indicated as grams per hour, is that which results during one-hour of cycle exercise at an intensity level of 70% of the maximum oxygen uptake. This is measured using indirect calorimetry. The difference in carbohydrate oxidation between a placebo and the modified starch ingestion is expressed as a percentage of the difference in the carbohydrate oxidation between the placebo and a glucose injection. The dose used is as was described in conjunction with the blood glucose response, i.e., 75 grams of the starch suspended in 350 ml of water. This dosage is ingested 30 minutes before the exercise.

Such oxidation characteristics thus are one method of determining that the modified starches behave the same way as does glucose. Further, the levels of digestibility and oxidation provide one method of assessing the relative caloric or energy value efficiency of an energy supplement. The preferred modified starches of the present invention achieve appropriate oxidation levels as well as digestibility. However, modified starches having satisfactory digestibility are suitable regardless of oxidation characteristics, as such materials can still achieve mutable caloric values through metabolic pathways other than oxidation.

The characteristics achieved by the modified starches of the present invention allow usage in any liquid nutritional product. An illustrative list of examples of the type of formulas include infant formulas, liquid enteric formulations for patients with comprised abilities to ingest food (viz., patients with nasogastric tubes and/or intestinal tubes), liquid supplements for use by, before, during, or after exercise, oral dietary aids to prevent hypoglycemia in certain types of genetic-based glycogen storage diseases, dietary aids for non-insulin dependent and insulin-dependent diabetic patients, oral dietary aids for carbohydrate-sensitive individuals (i.e., sensitive to existing carbohydrate formulations), and use in snack foods such as candies, cookies, cakes, pies, either alone or in combination with simple sugars and/or artificial sweeteners. Common to these nutritional products is an edible carrier, often a liquid such as water. In addition, such nutritional products can include any of the other typically used ingredients such as, for example, flavoring agents, emulsifiers, phosphates, salts, coloring agents, artificial colors, fats, proteins, sugars, artificial sweeteners, amino acids, preservatives, vitamins, minerals, baking soda, baking powder, other carbohydrates or starches, and pharmaceutical agents.

Indeed, the modified starches of the present invention may also be used in products which are in tablet or powder form. For example, oral dietary aids and certain snack foods may be desirably used in other than a liquid form. In this connection, the procedure for making the modified starches provides such starches in a dry powder form.

The relative amount of the modified starch used in the nutritional product is a nutritionally effective amount, i.e., that amount which will provide the caloric or energy value desired for the particular product. Typically, liquid products will use at least about 2 mg/ml, up to about 30 mg/ml, or more, while solid products will use one percent by weight or more, based on the total weight of the product.

The following Examples are illustrative, but not in limitation of, the present invention. As used in the following Examples, the following terms and tests may be described as follows:

Randomized, double blind fashion: A standard experimental design in which a group of subjects is assigned to be given several treatments in a randomized order and neither the subjects nor the investigator knows who is receiving which treatment in what order. Instead, treatments are coded (e.g., A, B, C, D etc.) and the key to the code is not disclosed until the experiment is completed.

Blood glucose concentration: Standard quantification of the glucose level in blood. Units used are mM (millimoles per liter).

Hyperglycemic area: Ingestion of a carbohydrate typically increases the blood glucose concentration above baseline values (baseline is usually 4–5 mM) for 2–3 hours. The difference between blood glucose concentration and baseline concentration is graphed as a function of time and the hyperglycemic area is the geometric area under this curve. Units are mM×min.

Glycemic index: This represents the size of the blood glucose concentration response after ingestion of the experimental substance. Size is measured as the hyperglycemic area (see above) and is expressed as a percentage of the hyperglycemic area resulting from a dextrose/glucose feeding in the same subject under identical conditions.

Serum insulin concentrations: Concentration of insulin in serum obtained after centrifuging off the red blood cells. Units are uIU/mL (micro-International Units per mL).

$VO_2$max: Maximum ability to consume oxygen. This is measured herein as peak oxygen uptake during incremental continuous cycle ergometer test to volitional exhaustion. More specifically, the subject pedals on a stationary bike at a prescribed rate (60 rpm herein), beginning with no pedal resistance. Then, every three minutes the pedal resistance is increased until the subject can no longer maintain the prescribed pedal rate. During the test, oxygen uptake is measured continuously using indirectly calorimetry (standard method); and the highest oxygen uptake is taken as the $VO_2$max.

Muscle glycogen use: The positive difference in muscle glycogen concentration between pre-exercise and immediately post-exercise.

Respiratory quotient: As used herein, this is the ratio of carbon dioxide produced per minute to oxygen consumed per minute ($VCO_2/VO_2$). This is a standard measurement obtained from indirect calorimetry and allows the proportion and quantity of carbohydrate being oxidized by the body during exercise to be determined.

X±SEM: Group mean (average) plus or minus one standard error of the mean (SEM=standard derivation divided by square root of n minus one, where n is the number of subjects).

ANOVA: Analysis of variance.

EXAMPLE 1

This Example shows the effect on the molecular weight of varying the concentration of the starch being modified. A series of corn starch samples (amylomaize-7) were suspended in one liter of ethanol for three days at 20°–22° C. while various concentrations of hydrochloric acid were used and the level of the starting or unmodified starch was varied from 0.25 kg to 0.5 kg and to 1 kg per liter of ethanol. The relative amounts of starch and the levels of hydrochloric acid are set forth in Table 1 together with the resulting number average molecular weight of the modified starches:

TABLE 1

| HCl | | Amount of High Amylose Corn Starch | | |
|---|---|---|---|---|
| (% w/v) | (mL/L) | 1 Kg | 0.5 Kg | 0.25 Kg |
| 0.36 | 10 | 54108 ± 2268 | 50706 ± 3402 | 39204 ± 1782 |
| 0.71 | 20 | 52650 ± 3564 | 45360 ± 1620 | 36288 ± 2430 |
| 1.05 | 30 | 50544 ± 2430 | 40662 ± 1944 | 35487 ± 810 |
| 1.39 | 40 | 49410 ± 2268 | 34830 ± 2754 | 30456 ± 1085 |
| 1.71 | 50 | 46008 ± 1944 | 34344 ± 2106 | 29160 ± 1620 |
| 2.04 | 60 | 41148 ± 1620 | 34020 ± 2430 | 24786 ± 988 |
| 3.27 | 100 | 37260 ± 1166 | 29970 ± 2268 | 23652 ± 1490 |

Figure 1:
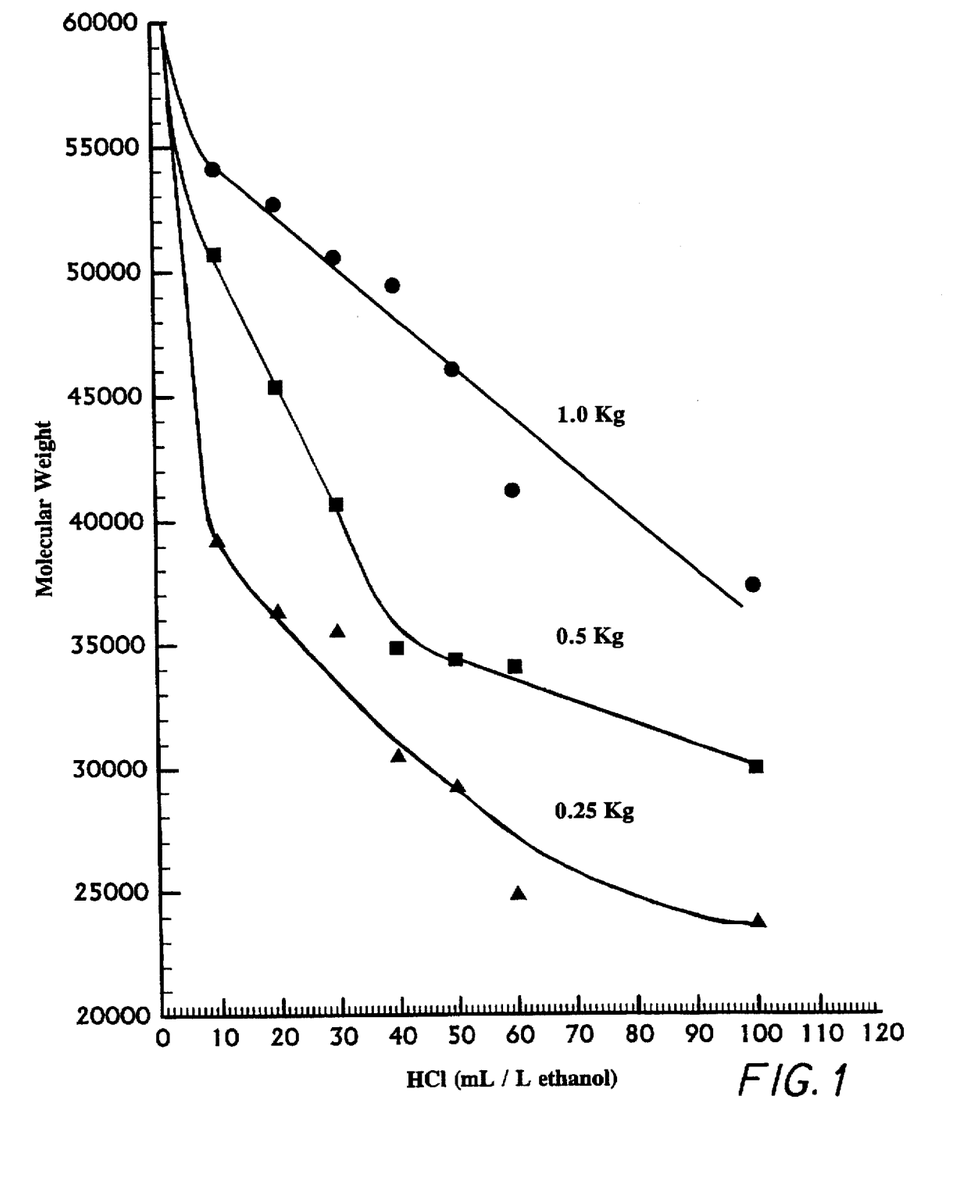
FIG. 1 is a graph of the molecular weight of modified corn starch versus concentration of acid and illustrating the effect on the resulting molecular weight as the acid concentration is varied using different levels of the starting, unmodified corn starch.

The results are set forth in graph form in FIG. 1.

As can be seen in FIG. 1, all of the resulting modified high amylose starch materials exhibited number average molecular weights within the range useful in the present invention. Further, at a given level of the starting starch material, the molecular weight decreases with the use of increasing levels of the hydrochloric acid. By appropriate selection of the level of starting starch material, the desired molecular weight and the relative amount of the hydrochloric acid used, modified high amylose starch materials having the desired molecular weight can readily be obtained.

EXAMPLE 2

This Example illustrates the effect of using differing lower alcohols as the treating or reaction medium.

A series of high amylose corn starch samples (amylomaize-7) were acid treated at 20°–22° C. for three days at a level of 0.25 kg/liter of the lower alcohol employed. Four series of the high amylose corn starch samples were treated using methanol, ethanol, 2-propanol, and 1-butanol. The number average molecular weights were determined and the parameters and resulting molecular weights are shown in Table 2:

TABLE 2

| HCL Concentration | | Alcohol | | | |
|---|---|---|---|---|---|
| (% w/v) | (mL/L) | MeOH | EtOH | 2-PrOH | 1-BuOH |
| 0.36 | 10 | 48924 ± 2754 | 39204 ± 1782 | 20412 ± 1118 | 16200 ± 405 |
| 0.71 | 20 | 46980 ± 2916 | 36288 ± 2430 | 18306 ± 1037 | 14126 ± 551 |
| 1.39 | 40 | 45846 ± 1944 | 30456 ± 1085 | 17172 ± 1377 | 12442 ± 389 |
| 2.67 | 80 | 45846 ± 2430 | 24138 ± 1037 | 17010 ± 486 | 10481 ± 275 |
| 5.0 | 160 | 35964 ± 2268 | 21060 ± 1069 | 12814 ± 373 | 9007 ± 324 |

Figure 2:
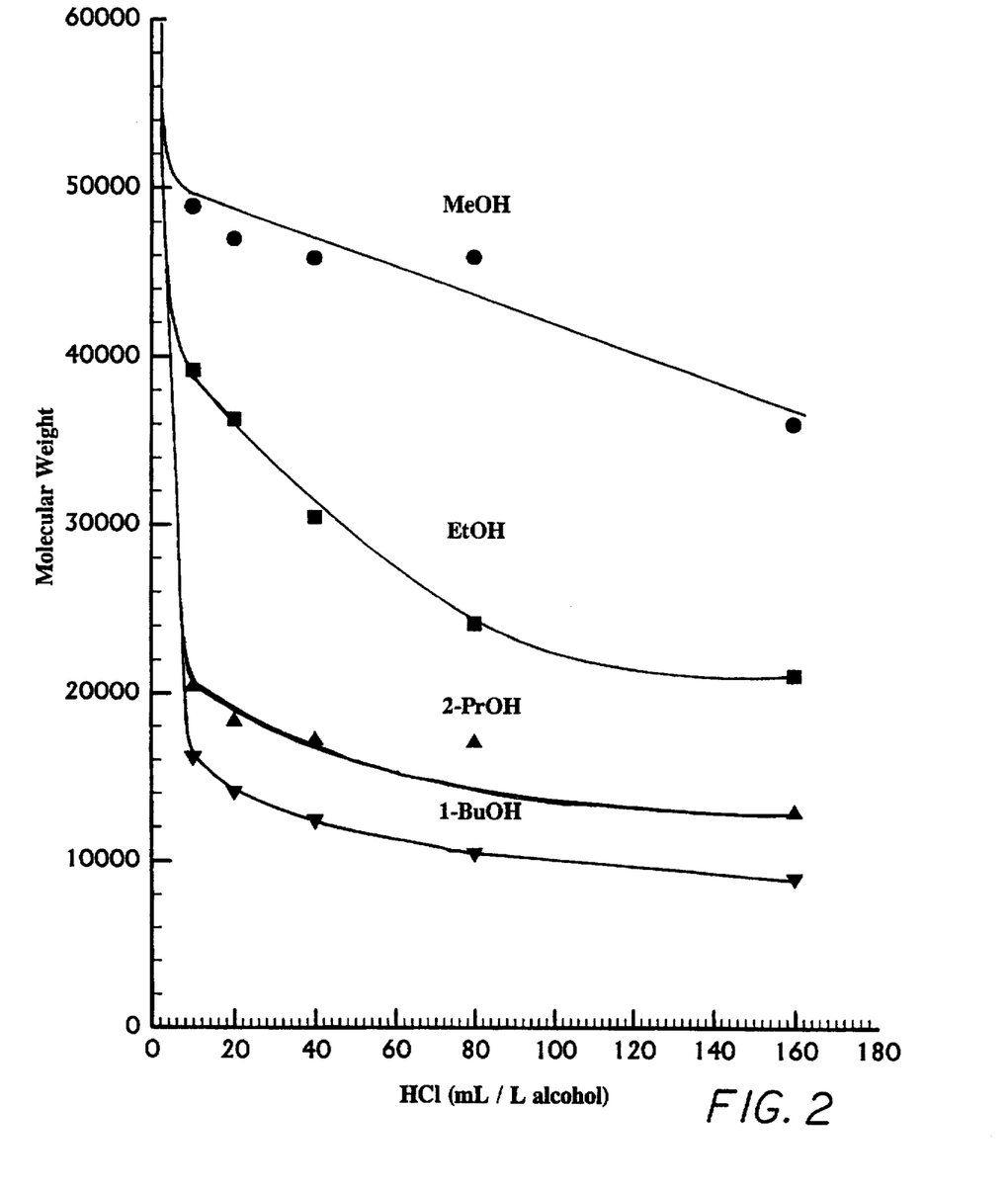
FIG. 2 is a graph of the molecular weight of the modified corn starch versus acid concentration when using certain alcohols as the reaction medium.

The results are graphed in FIG. 2 which illustrates the varying molecular weight with the various levels of hydrochloric acid for the alcohols utilized.

As can be seen, the resulting number average molecular weight of the thus-modified high amylose corn starch is the highest when methanol is used and then decreases progressively for ethanol, 2-propanol and 1-butanol, respectively.

EXAMPLE 3

This Example is similar to Example 1 with the exception of showing the effect of the starch concentration on the resulting molecular weight of the acid-modified starch when potato starch is used.

Three series of potato starch samples, each at starting levels of 0.25 kg, 0.5 kg, and 1 kg, were subjected to various amounts of hydrochloric acid while suspended in one liter of ethanol for three days at a temperature of 20° C. The resulting molecular weights were determined, and the results are set forth in Table 3:

TABLE 3

| HCl | | Amount of Starch/Liter of Ethanol | | |
|---|---|---|---|---|
| (% w/v) | (mL/L) | 1 Kg | 0.5 Kg | 0.25 Kg |
| 0.36 | 10 | 314,000 ± 2700 | 187,000 ± 1500 | 85,000 ± 1000 |
| 0.71 | 20 | 182,000 ± 2000 | 100,500 ± 1200 | 40,000 ± 700 |
| 1.05 | 30 | 130,000 ± 1500 | 72,000 ± 1200 | 37,000 ± 500 |
| 1.39 | 40 | 111,000 ± 1200 | 67,000 ± 1200 | 35,000 ± 500 |
| 1.71 | 50 | 100,000 ± 1200 | 66,000 ± 1200 | 34,000 ± 450 |
| 2.04 | 60 | 67,000 ± 1000 | 60,000 ± 1000 | 30,000 ± 400 |

Figure 3:
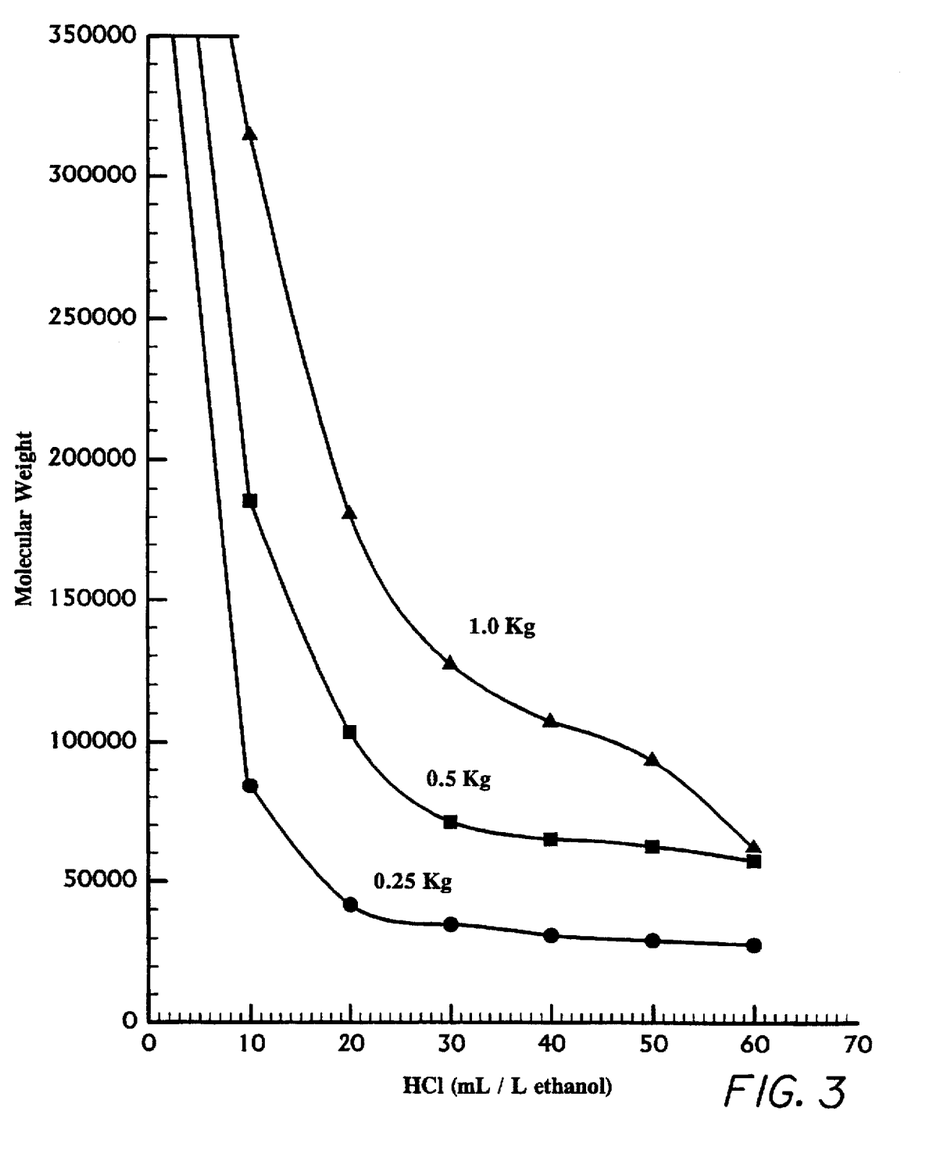
FIG. 3 is a graph similar to FIG. 1, except illustrating the effect of the starting, unmodified starch level on molecular weight when potato starch is used.

The graph of the molecular weight for the resulting potato starch modified samples versus the amount of hydrochloric acid used for treating the potato starch is set forth in FIG. 3.

As is shown, the results generally follow the trend exhibited with the high amylose corn starch as discussed in Example 1. Thus, at a given hydrochloric acid concentration for treating, the resulting molecular weight decreases as the amount of the potato starch suspended in the reaction medium decreases. Similarly, at a given level of potato starch being treated, increasing amounts of the treating acid likewise results in the resulting molecular weight being decreased.

EXAMPLE 4

This Example is similar to Example 2, except using potato starch instead of a high amylose corn starch.

As in Example 2, methanol, ethanol, 2-propanol and 1-butanol were used as the alcohol reaction media. Potato starch was modified in these alcohols for three days while being maintained at a temperature of 25° C. and exposed to various concentrations of hydrochloric acid, while the potato starch level was 0.25 kg suspended in one liter of the respective alcohol. The number average molecular weights are set forth in Table 4:

TABLE 4

| HCL Concentration | | Alcohol | | | |
|---|---|---|---|---|---|
| (% w/v) | (mL/L) | MeOH | EtOH | 2-PrOH | 1-BuOH |
| 0.36 | 10 | 196020 | 59940 | 14580 | 11016 |
| 0.71 | 20 | 126360 | 38394 | 10433 | 9736 |
| 1.39 | 40 | 87966 | 28206 | 8780 | 5897 |
| 2.67 | 80 | 63990 | 23184 | 7063 | 5557 |
| 5.0 | 160 | 31590 | 13446 | 6642 | 3969 |

Figure 4:
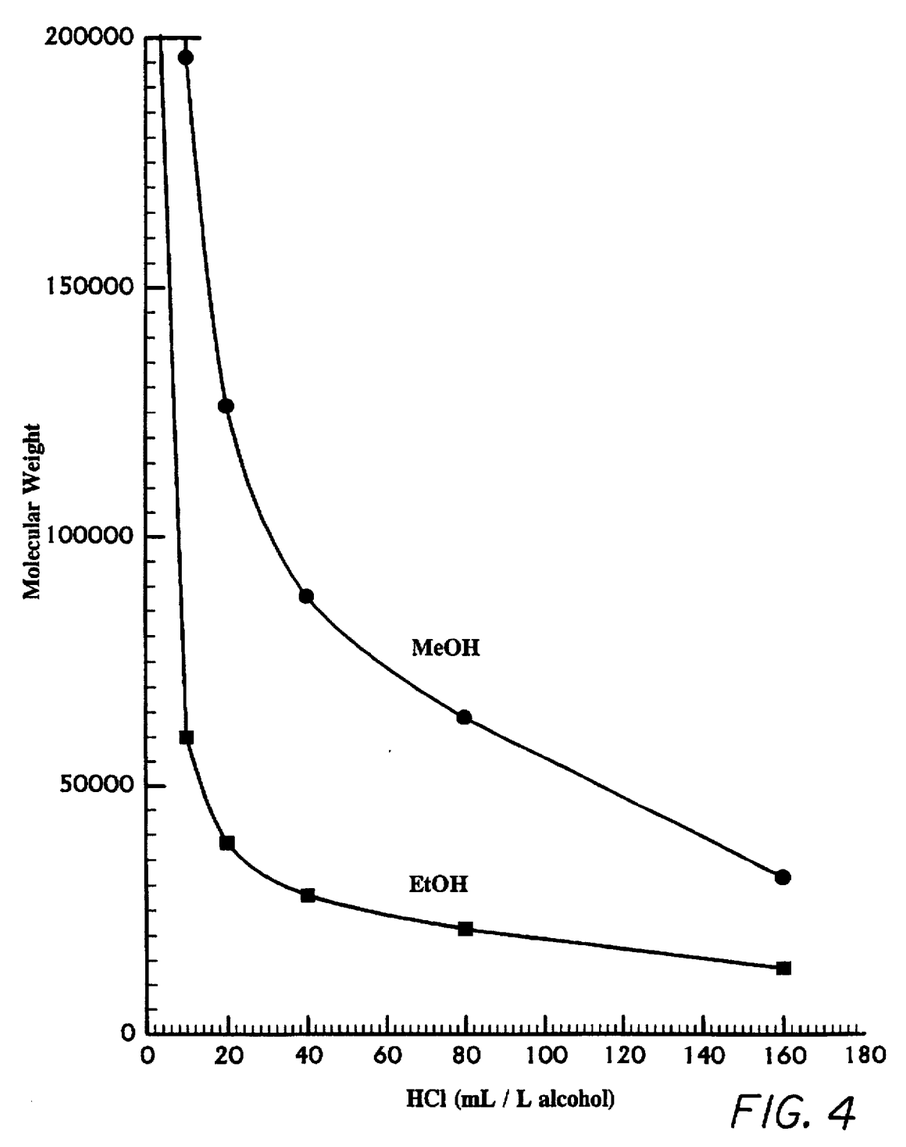
FIG. 4 is a graph similar to FIG. 2, except showing the effects when potato starch is utilized.
Figure 5:
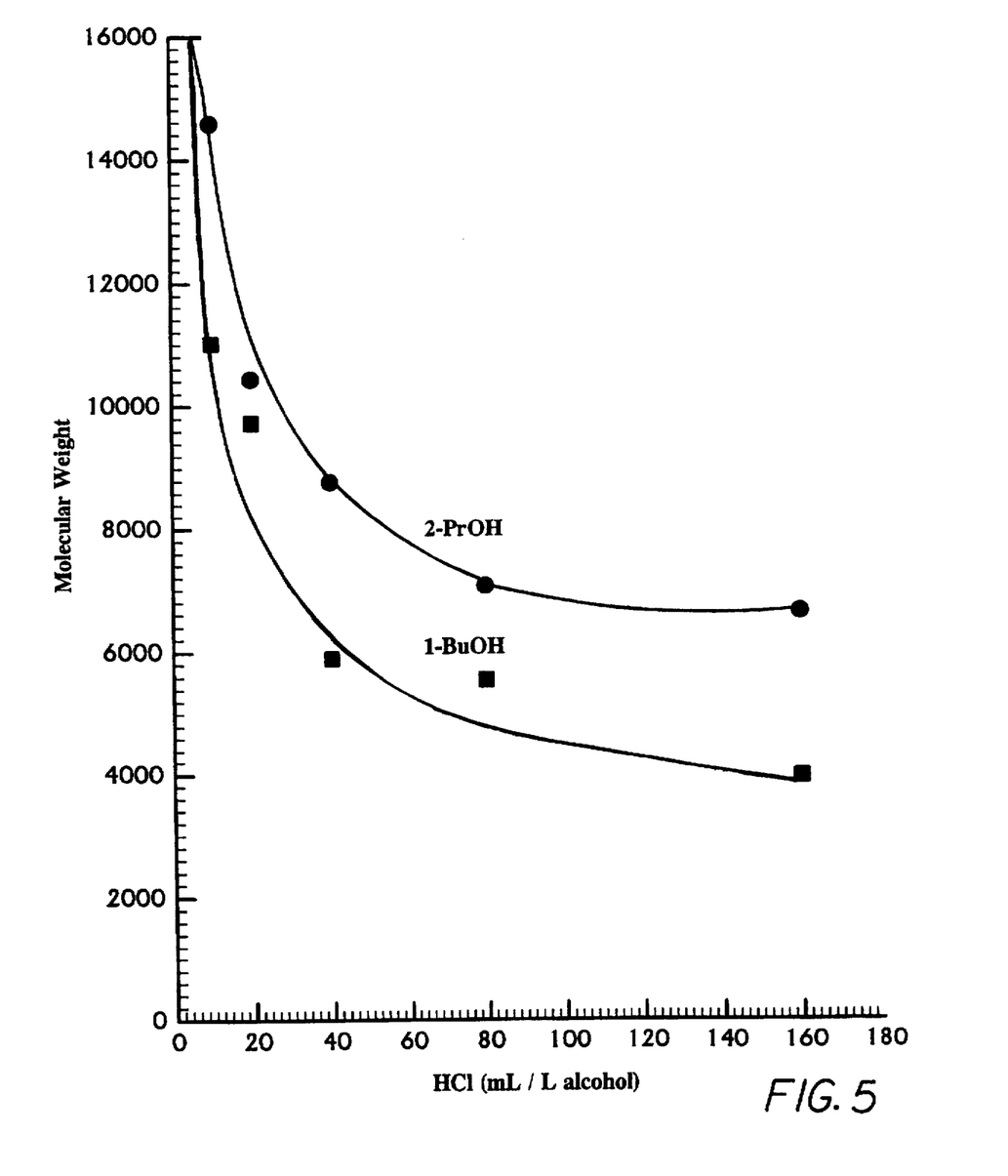
FIG. 5 is a graph similar to FIG. 4, except employing other alcohols as the reaction medium.

FIG. 4 shows the results obtained using methanol and ethanol while FIG. 5 shows the results using 2-propanol and 1-butanol.

As was also the case with the high amylose corn starch, the resulting molecular weight of the modified potato starch decreased as the reaction medium varied from methanol, to ethanol, 2-propanol and 1-butanol. Further, as can be seen, when using methanol or ethanol, the amount of the potato starch being treated and/or the level of hydrochloric acid being used must be coordinated to avoid unduly high molecular weights in the resulting modified potato starch.

EXAMPLE 5

This Example compares the glycemic responses in a study when the modified high amylose starch and potato starch were ingested as well as the use of glucose for comparison.

The modified high amylose corn starch was made by suspending 10 kg of amylomaize-7 starch (Hylon VII, obtained from National Starch & Chemical Corporation, Bridgewater, N.J.) in 10 liters of ethanol. The reaction was started by the addition of one liter of concentrated hydrochloric acid and allowed to go three days (72 hours) at ambient temperature (20°–21° C.) with occasional stirring (approximately 4 times per day). After three days, the starch was allowed to settle, the supernatant was poured off; and five liters of 70% volume for volume (v/v) ethanol was added and the starch was then filtered. The starch was washed on the filter with 70% ethanol until the filtrate was neutral (requiring about 10 liters of 70% ethanol). The starch was spread out in pans and allowed to air dry 15 hours. The resulting material was modified amylomaize-7 starch and had a number average molecular weight of about 38,000. The modified potato starch had a number average molecular weight of 40,000 and was made by a process identical to that described for amylomaize-7.

In the study, at one week intervals, 6 males and 4 females (25±1 year) ingested the modified starches and glucose at a level of 75 grams dissolved in a final volume of 360 ml water. These various carbohydrates were administered in a randomized, double-blind fashion, and each subject participated in all 3 trials. A 12-hour fasting forearm venous blood sample was collected before ingestion and at 30, 60, 90, 120 and 180 minutes after ingestion. The subjects were required to record all food and beverages consumed for two days prior to their first trial and then to duplicate this diet for the two days prior to each subsequent trial.

Serum was analyzed for glucose concentration and immediately frozen for further analysis. The glycemic index associated with the two modified starches was evaluated by comparing the area under the blood glucose response curve to the starch obtained after ingestion of dextrose. Blood glucose concentration was analyzed for significant differences among the carbohydrates using a two-way (starch× time) repeated measures ANOVA. Hyperglycemic area was analyzed for differences among carbohydrates using a one-way repeated measures ANOVA. When a significant F ratio was obtained with ANOVA, a Newman-Keul post-hoc test was used to locate significant mean differences. Hyperglycemic area after starch ingestion was expressed as a percentage of the hyperglycemic area obtained after glucose ingestion and was analyzed for significant difference using a paired t-test. Differences among means were evaluated at the p<0.05 level. The results are presented as "mean±SE."

Because one subject (a female) had an abnormal glucose-tolerance (the blood glucose remained above 8 mM for 3 hours), her data were excluded from the analysis of results. Pre-ingestion blood glucose concentrations were similar among the three trials (modified potato starch: 5.2±0.2 mM; glucose: 5.2±0.2 mM; modified high amylose starch: 5.1±0.1 mM) with an intra-subject coefficient of variation that averaged 3.7%.

The results are set forth in Table 5:

TABLE 5

| Time | Glucose | Modified High Amylose Starch | Modified Potato Starch |
|---|---|---|---|
| Pre-ingestion | 5.2 ± 0.1 | 5.1 ± 0.1 | 5.2 ± 0.2 |
| 30 minutes | 7.8 ± 0.6 | 5.4 ± 0.1 | 5.2 ± 0.3 |
| 60 minutes | 5.8 ± 0.3 | 5.3 ± 0.2 | 5.1 ± 0.1 |
| 90 minutes | 5.2 ± 0.4 | 5.3 ± 0.1 | 5.1 ± 0.2 |
| 120 minutes | 4.9 ± 0.3 | 5.1 ± 0.1 | 5.1 ± 0.2 |
| 180 minutes | 4.1 ± 0.2 | 5.0 ± 0.1 | 5.1 ± 0.2 |

Thirty minutes after ingestion, the blood glucose concentration rose in the glucose and the modified high amylose starch, but not in the modified potato starch. The peak values for blood glucose concentration were reached at 30 minutes for both glucose and modified high amylose starch. Subsequently, the glucose concentration dropped progressively through the remainder of the sampling period for both. As is seen, at 120 and 180 minutes, the blood glucose concentration was significantly below the pre-ingestion level only after glucose ingestion.

The calculation of the hyperglycemic area revealed that the glucose resulted in the greatest area (122±36 mM.min) while both modified high amylose starch (35±12 mM.min) and the modified potato starch (15±7 mM.min) resulted in significantly lower areas. The difference in the area between the modified high amylose corn and potato starches approached significance (p=0.08). When expressed as a percentage of the area obtained after glucose ingestion, the modified potato starch yielded a glycemic index of 14±7% and the modified high amylose corn starch yielded a glycemic index of 29±10%.

The serum insulin concentration for a three hour period after ingestion was also determined, and the results are set forth in Table 6:

TABLE 6

| Time | Glucose | Modified High Amylose Starch | Modified Potato Starch |
|---|---|---|---|
| Pre-ingestion | 7.7 ± 1.4 | 4.6 ± 0.8 | 6.1 ± 0.6 |
| 30 minutes | 47.0 ± 11.0 | 7.5 ± 0.9 | 7.5 ± 0.8 |
| 60 minutes | 53.2 ± 12.7 | 9.2 ± 4.5 | 6.1 0.7.1 |
| 90 minutes | 35.9 ± 6.4 | 6.6 ± 1.2 | 5.5 ± 0.7 |
| 120 minutes | 20.7 ± 3.4 | 5.7 ± 1.2 | 5.6 ± 0.8 |
| 180 minutes | 6.7 ± 1.2 | 5.6 ± 1.3 | 5.5 ± 0.5 |

EXAMPLE 6

This Example illustrates the metabolic effects of ingesting the modified starches of this invention in humans.

Ten subjects received, on separate occasions, each of the test meals (75 g each of modified high amylose corn starch, modified potato starch, glucose and a placebo) thirty minutes before a 60-minute exercise at an intensity of 70% $VO_2$max. The modified high amylose corn and potato starches were those described in Example 5.

In addition to the blood sampling and assays for setting glycemic responses, indirect calorimetry was used to assess caloric expenditure, carbohydrate oxidation and fat oxidation during the exercise period.

Table 7 sets forth the blood glucose concentrations (mM) thirty minutes before feeding (listed in the Table as −30 min), before exercise (0 min) and after 30 and 60 minutes of exercise at 70% $VO_2$max:

TABLE 7

| Time | Placebo | Glucose | Modified High Amylose Starch | Modified Potato Starch |
|---|---|---|---|---|
| −30 min | 4.6 ± 0.2 | 4.9 ± 0.1 | 4.9 ± 0.1 | 4.7 ± 0.1 |
| 0 min | 4.5 ± 0.2 | 7.7 ± 0.7 | 5.2 ± 0.2 | 5.1 ± 0.2 |
| 30 min | 4.5 ± 0.2 | 4.4 ± 0.4 | 5.1 ± 0.2 | 4.8 ± 0.2 |
| 60 min | 4.5 ± 0.2 | 4.6 ± 0.2 | 4.8 ± 0.2 | 4.7 ± 0.2 |

During the placebo trial, the blood glucose was not affected by exercise. However, after the glucose feeding, blood glucose concentration rose to 7.7±0.7 mM at the start of exercise and then dropped significantly to 4.4±0.4 mM thirty minutes into the work period. Both of the modified starches resulted in slight, but significant, increases in blood glucose at the start of the exercise. The elevated blood glucose concentration was maintained during exercise in the modified high amylose corn starch trial, but not in the modified potato starch trial.

The muscle glycogen use was increased significantly in the glucose trial (61±8 umol/g) compared with the placebo trial (40±7 umol/g). Glycogen use during the modified high amylose corn starch trial (45±7 umol/g) was not significantly different from the placebo level, while glycogen use during the modified potato starch trial was not significantly different from that resulted from the use of glucose (55±8 umol/g). The respiratory quotient during the trials was significantly greater during the modified high amylose corn starch and glucose trials (0.953±0.007 and 0.959±0.008, respectively) than resulted in the modified potato starch and placebo trials (0.943±0.008 and 0.944±0.009, respectively). These data indicate that, while measures of total carbohydrate availability were increased in the modified high amylose corn starch and glucose trials, the lower glycemic response, and perhaps the sustained level of blood glucose during exercise in the modified high amylose corn starch, prevented the usual acceleration of glycogen use as is seen with glucose.

EXAMPLE 7

This Example determines the relative digestibility of the modified starches of the present invention.

The modified high amylose corn starch and potato starch used were those described in Example 5. Digestibility was determined and compared to that of standard commercial corn starch and glucose.

Thirty-six 5-week old male rats were randomly divided into groups and fed the four carbohydrates at 55 g/100 g diet. The diet was based on the A.I.N.-76 diet with 10 g fructose/100 g diet, and the composition of the diet is set forth in Table 8:

TABLE 8

| Ingredient | Grams |
|---|---|
| casein | 20.0 |
| D,L-methionine | 0.3 |
| mineral mix (AIN) | 3.5 |
| vitamin mix (AIN) | 1.0 |
| choline chloride | 0.2 |
| corn oil | 5.0 |
| fiber | 5.0 |
| fructose | 10.0 |
| carbohydrate | 55.0 |
| TOTAL | 100.0 |

The rats were fed ad libitum until nine weeks of age. Body weight, weight gain, and food consumption were recorded weekly. The body weights and weight gain were similar in all groups. Set forth in Table 9 are the average weekly body weight in grams through week 4:

TABLE 9

| Week | Regular Corn Starch | Glucose | Modified Potato Starch | High Amylose Modified Corn Starch |
|---|---|---|---|---|
| 0 | 119.8 ± 1.0ª | 125.8 ± 2.1ª | 123.4 ± 2.6ª | 121.3 ± 3.0ª |
| 1 | 186.5 ± 2.5ᵇ | 186.7 ± 2.5ᵇ | 192.3 ± 3.7ᵇ | 190.9 ± 3.7ᵇ |
| 2 | 230.7 ± 3.1ᶜ | 227.6 ± 2.8ᶜ | 232.6 ± 4.5ᶜ | 233.6 ± 5.6ᶜ |
| 3 | 275.7 ± 4.9ᵈ | 266.4 ± 4.6ᵈ | 272.2 ± 6.9ᵈ | 276.0 ± 7.2ᵈ |
| 4 | 286.5 ± 5.6ᵉ | 283.1 ± 5.4ᵉ | 291.7 ± 5.1ᵉ | 295.4 ± 7.6ᵉ |

Values are the means ± S.E.M n = 9 per group. Means with the different letter are significantly different (P <0.05). The analysis of variance indicates that week (P <0.0001) was significant. The diet and week*diet interaction were not significant.

Food consumption was much higher in the potato starch-fed group (P<0.001) compared to consumption with the other groups. Table 10 sets forth the average weekly food consumption in grams through week 4:

TABLE 10

| Week | Regular Corn Starch | Glucose | Modified Potato Starch | High Amylose Modified Corn Starch |
|---|---|---|---|---|
| 1 | 131.8 ± 2.7ª | 131.6 ± 2.8ᵃᵈ | 178.1 ± 3.2ᵇ | 160.6 ± 3.5ᶜ |
| 2 | 125.9 ± 2.1ª | 127.3 ± 2.4ª | 177.5 ± 4.7ᵇ | 160.8 ± 4.6ᶜᶠ |
| 3 | 136.6 ± 2.6ᵃᵈ | 135.2 ± 2.8ᵈ | 187.6 ± 8.6ᵇ | 173.5 ± 4.3ᶠ |
| 4 | 123.7 ± 8.0ª | 131.5 ± 7.5ᵃᵈ | 184.2 ± 8.6ᵇ | 153.2 ± 10.1ᶠ |

TABLE 10-continued

| Week | Regular Corn Starch | Glucose | Modified Potato Starch | High Amylose Modified Corn Starch |
|---|---|---|---|---|

Values are the means ± S.E.M. n = 9 per group. Means with the different letter are significantly different (P <0.05). The analysis of variance indicates that week (P <0.0015), diet (P <0.0001) were significant. The week*diet interaction were not significant.

The heart weight percent, percent heart/body weight (B.W.), epididymal fat pad weight, and percent fat pad/B.W. were low in the modified potato starch-fed group compared to that of the two control groups. In the high amylose modified corn starch-fed group, only the epididymal fat pad and percent fat pad/B.W. were low. Liver weight percent and percent liver weight/B.W. were higher in both the modified potato starch and high amylose modified corn starch-fed groups. Table 11 sets forth the organ weights in grams and the percent of organ weight/body weight:

TABLE 11

| Carbohydrate | Organ Weights | (Organ wt./Body wt.) × 100 |
|---|---|---|
| Heart | | |
| Regular corn starch | 1.13 ± 0.04ª | 0.41 ± 0.01ª |
| Glucose | 1.10 ± 0.06ª | 0.40 ± 0.02ª |
| Modified potato starch | 0.97 ± 0.03ᵇ | 0.35 ± 0.01ᵇ |
| High amylose modified corn starch | 1.07 ± 0.04ᵃᵇ | 0.39 ± 0.01ᵃᵇ |
| Epididymal Fat Pad | | |
| Regular corn starch | 2.26 ± 0.16ª | 0.82 ± 0.04ª |
| Glucose | 2.30 ± 0.15ª | 0.85 ± 0.05ª |
| Modified potato starch | 1.54 ± 0.05ᵇ | 0.57 ± 0.03ᵇ |
| High amylose modified corn starch | 1.95 ± 0.14ᵃᶜ | 0.70 ± 0.04ᵈ |
| Liver | | |
| Regular corn starch | 7.77 ± 0.27ª | 2.83 ± 0.05ª |
| Glucose | 7.31 ± 0.23ª | 2.70 ± 0.05ª |
| Modified potato starch | 8.87 ± 0.31ᵇ | 3.25 ± 0.07ᵇ |
| High amylose modified corn starch | 8.94 ± 0.34ᵇ | 3.24 ± 0.13ᵇ |

Values are the means ± S.E.M. n = 9 for each group. Means with the different letter are significantly different (P <0.05). The analysis of variance indicates that the effect of diet (P <0.0001) was significant for the heart wt., heart wt./body wt., fat pad wt., fat pad wt./body wt., liver wt., and liver wt./body wt.

The mean liver contents of the rats are set forth in Table 12, the weights set forth being in grams:

TABLE 12

| | Regular Corn Starch | Glucose | Modified Corn Starch | High Amylose Modified Corn Starch |
|---|---|---|---|---|
| Liver Wt. | 7.77 ± 0.27ª | 7.31 ± 0.23ª | 8.87 ± 0.31ᵇ | 8.94 ± 0.34ᵇ |
| % Liber Wt./B. Wt. | 2.83 ± 0.05ª | 2.70 ± 0.05ª | 3.25 ± 0.07ᵇ | 3.24 ± 0.13ᵇ |
| Water Content | 5.62 ± 0.19ª | 5.32 ± 0.19ª | 6.44 ± 0.25ᵇ | 6.54 ± 0.26ᵇ |
| % Water/Liver Wt. | 72.40 ± 0.62ª | 72.71 ± 0.46ª | 72.57 ± 0.58ª | 73.16 ± 0.45ª |
| Total Protein | 1.38 ± 0.07ª | 1.13 ± 0.06ᵇ | 1.32 ± 0.06ᵃᵇ | 1.33 ± 0.07ª |
| % Protein/Liver Wt. | 17.73 ± 0.65ª | 15.66 ± 1.01ᵇ | 14.85 ± 0.53ᵇ | 14.87 ± 0.57ᵇ |
| Total Lipids | 0.32 ± 0.01ª | 0.32 ± 0.01ª | 0.43 ± 0.02ᵇ | 0.38 ± 0.01ᶜ |
| % Lipids/Liver Wt. | 4.14 ± 0.09ª | 4.42 ± 0.11ª | 4.85 ± 0.16ᵇ | 4.27 ± 0.16ª |

Values are the means ± S.E.M. n = 9 per group. Means in each row with the different letter are significantly different at the 0.05 level (ANOVA).

Table 13 sets forth the mean fasting serum levels of the rats:

TABLE 13

|  | Regular Corn Starch | Glucose | Modified Corn Starch | High Amylose Modified Corn Starch |
|---|---|---|---|---|
| Glucose (mg/dl) | 71.9 ± 4.8[a] | 77.1 ± 9.2[a] | 116.5 ± 10.5[b] | 130.9 ± 16.4[b] |
| FFA (mM) | 0.84 ± 0.06[a] | 0.92 ± 0.04 | 1.18 ± 0.09[b] | 1.00 ± 0.33[ab] |
| TAG (mg/dl) | 141.6 ± 8.7[a] | 136.9 ± 10.2[a] | 137.9 ± 9.6[a] | 151.4 ± 11.4[a] |
| Protein (g/dl) | 7.38 ± 0.14[a] | 7.06 ± 0.18[a] | 6.60 ± 0.15[b] | 7.28 ± 0.13[a] |
| Insulin (μIU/ml) | 9.77 ± 0.99[a] | 9.40 ± 0.60[a] | 7.15 ± 0.7[b] | 10.41 ± 0.52[a] |
| Glucagon (pg/ml) | 331.5 ± 36.3[ab] | 304.0 ± 33.7[b] | 416.9 ± 35.2[ac] | 463.6 ± 45.2[c] |
| Insulin/Glucagon | 3.13 ± 0.37[ac] | 3.23 ± 0.24[a] | 1.79 ± 0.21[b] | 2.42 ± 0.24[b] |

Values are the means ± S.E.M. n = 9 per group. Means in each row with the different letter are significantly different at the 0.05 level (ANOVA).

Digestibility was calculated in terms of glucose units as (Intake−Feces)/Intake. Digestibility was determined as an average of three days, and the results are set forth in Table 14, as are the digestible energy levels:

TABLE 14

| Carbohydrate | Digestibility (%) Carbohydrate | Digestible Energy (%) (diet) |
|---|---|---|
| Regular corn starch | 100.00 ± 0.00[a] | 94.17 ± 0.22[a] |
| Glucose | 100.00 ± 0.00[a] | 94.23 ± 0.17[a] |
| Modified Potato Starch | 69.01 ± 1.17[b] | 70.77 ± 0.67[b] |
| High Amylose Modified Corn Starch | 91.54 ± 0.83[c] | 83.62 ± 1.14[c] |

Values are the means ± S.E.M. n = 9 per group. Means with the different letter are significantly different (P <0.005). The analysis of variance indicates that the diet (P <0.0001) was significant.

Thus, as has been seen, the present invention provides modified starch materials that have desirable physiological responses, permitting there desirable use in a variety of nutritional products. The use of modified corn starch, particularly amylomaize-7, provides particular advantage, both due to the enhanced digestibility as well as a relatively slow release of metabolizable carbohydrates, giving a source of carbohydrate energy over a much longer period of time than can be obtained from glucose and other carbohydrates such as lactose, fructose, or sucrose.

We claim:

1. A nutritional food product comprising an acid-treated starch having a number average molecular weight of at least about 10,000, and physiological characteristics comprising an insulin response of no more than 50%, an osmolarity of no more than about 400 mOsm per liter, and a digestiblity of at least 50%.

2. The food product of claim 1, wherein said starch has an osmolarity of no more than about 200 mOsm per liter.

3. The food product of claim 1, wherein said starch has a osmolarity of no more than about 100 mOsm per liter.

4. The food product of claim 1, wherein said starch has an insulin response of no more than 10%.

5. The food product of claim 1, wherein the starch is carried in an edible liquid carrier, said edible carrier is water, and the solubility of said starch in water is at least 2 milligrams per milliliter.

6. The food product of claim 1, wherein said starch has a number average molecular weight in the range of about 10,000 to 90,000.

7. The food product of claim 5, wherein said solubility is at least 5 milligrams per milliliter.

8. The food product of claim 7, wherein said solubility is at least 10 milligrams per milliliter.

9. The food product of claim 1, wherein said physiological characteristics include a blood glucose response peak of no more than 50%.

10. The food product of claim 9, wherein said physiological characteristics include a blood glucose response peak of no more than 12%.

11. The food product of claim 10, wherein said physiological characteristics include a blood glucose response peak of no more than 0%.

12. The food product of claim 1, wherein said physiological characteristics include a blood glucose response area of no more than 75%.

13. The food product of claim 12, wherein said physiological characteristics include a blood glucose response area of no more than 30%.

14. The food product of claim 13, wherein said physiological characteristics include a blood glucose response area of no more than 10%.

15. The food product of claim 1, wherein said physiological characteristics include an oxidation characteristic of at least 50%.

16. The food product of claim 15, wherein said physiological characteristics include an oxidation characteristic of at least 100%.

17. The food product of claim 16, wherein said physiological characteristics include an oxidation characteristic of at least 200%.

18. The food product of claim 1, wherein said starch is corn starch.

19. The food product of claim 18, wherein said starch is amylomaize-7.

* * * * *